(12) United States Patent
Ono

(10) Patent No.: US 10,552,963 B2
(45) Date of Patent: Feb. 4, 2020

(54) IMAGING DEVICE, IMAGING METHOD, AND NON-TRANSITORY RECORDING MEDIUM

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 127 days.

(21) Appl. No.: 15/871,913

(22) Filed: Jan. 15, 2018

(65) Prior Publication Data

US 2018/0158195 A1   Jun. 7, 2018

Related U.S. Application Data

(63) Continuation of application No. PCT/JP2016/058054, filed on Mar. 15, 2016.

(30) Foreign Application Priority Data

Aug. 19, 2015 (JP) .................................. 2015-161765

(51) Int. Cl.
    *G06T 7/246* (2017.01)
    *H04N 5/232* (2006.01)
    *H04N 5/225* (2006.01)

(52) U.S. Cl.
    CPC ........... *G06T 7/248* (2017.01); *H04N 5/2258* (2013.01); *H04N 5/23296* (2013.01); *G06T 2207/20076* (2013.01)

(58) Field of Classification Search
    CPC .......... G06T 7/248; G06T 7/292; G06T 7/246
    See application file for complete search history.

(56) References Cited

U.S. PATENT DOCUMENTS

| 8,994,794 B2 * | 3/2015 | Ono ..................... H04N 5/3696 348/49 |
| 9,197,827 B2 * | 11/2015 | Ono ....................... G03B 15/00 |

(Continued)

FOREIGN PATENT DOCUMENTS

| EP | 0392671 | 10/1990 |
| JP | 2007306406 | 11/2007 |

(Continued)

OTHER PUBLICATIONS

"International Search Report (Form PCT/ISA/210) of PCT/JP2016/058054," dated Jun. 7, 2016, with English translation thereof, pp. 1-3.

(Continued)

*Primary Examiner* — Obafemi O Sosanya
(74) *Attorney, Agent, or Firm* — JCIPRNET

(57) ABSTRACT

An imaging device, an imaging method, a program, and a non-transitory recording medium capable of easily coping with interference and suppressing an increase in cost due to countermeasures for preventing the interference such as providing a light shielding band are provided. In an imaging device according to an aspect of the present invention, an imaging unit includes an imaging optical system including a first optical system and a second optical system provided in a different area and having different imaging characteristics, and a directivity sensor, and first and second true movement vectors in first and second images are extracted on the basis of first and second possibilities of movement vectors calculated according to first and second movement vectors that are detected movement vectors of a subject in first and second images obtained via the first and second optical systems.

20 Claims, 17 Drawing Sheets

(56) References Cited

U.S. PATENT DOCUMENTS

| | | | | |
|---|---|---|---|---|
| 2009/0128700 A1* | 5/2009 | Oshino | ............... | H04N 5/23248 |
| | | | | 348/580 |
| 2011/0050856 A1* | 3/2011 | Nakazawa | ........... | H04N 13/239 |
| | | | | 348/47 |
| 2012/0014565 A1* | 1/2012 | Akiyama | ................ | G06T 7/246 |
| | | | | 382/106 |
| 2016/0269667 A1 | 9/2016 | Ono | | |

FOREIGN PATENT DOCUMENTS

| | | |
|---|---|---|
| WO | 2013024636 | 2/2013 |
| WO | 2013146506 | 10/2013 |
| WO | 2015093332 | 6/2015 |

OTHER PUBLICATIONS

"Written Opinion of the International Searching Authority (Form PCT/ISA/237) of PCT/JP2016/058054," dated Jun. 7, 2016, with English translation thereof, pp. 1-7.
"Search Report of European Counterpart Application" dated May 2, 2018, p. 1-p. 5.

* cited by examiner

IMAGING DEVICE, IMAGING METHOD, AND NON-TRANSITORY RECORDING MEDIUM

CROSS-REFERENCE TO RELATED APPLICATIONS

This application is a Continuation of PCT International Application No. PCT/JP2016/058054 filed on Mar. 15, 2016, which claims priority under 35 U.S.C § 119(a) to Japanese Patent Application No. 2015-161765 filed on Aug. 19, 2015. Each of the above application(s) is hereby expressly incorporated by reference, in its entirety, into the present application.

BACKGROUND OF THE INVENTION

1. Field of the Invention

The present invention relates to an imaging device, an imaging method, a program, and a non-transitory recording medium, and more particularly, to an imaging device capable of acquiring a plurality of images having different imaging characteristics, an imaging method, a program related to the imaging device or the imaging method, and a non-transitory recording medium.

2. Description of the Related Art

In recent years, an imaging device capable of simultaneously acquiring a plurality of images having different imaging characteristics using an imaging system including optical systems having different imaging characteristics according to areas and a directivity sensor is known. As a use of such an imaging device, a tracking camera system for imaging a subject while tracking the subject is conceivable. In such a system, since a plurality of images having different imaging characteristics can be acquired simultaneously, tracking accuracy can be improved and tracking deviation can be made difficult to occur.

In the imaging device described above, signal components (brightness signals) having different characteristics may interfere with each other in the directivity sensor, and a false image is likely to be generated. Generally, in a system that analyzes image information and tracks an object of interest, since a feature point is extracted from an image and motion information (movement vector) is detected and used for tracking, a motion of the false image may be erroneously recognized as a motion of a true image in a case where there is the false image as described above in the acquired image.

Further, as an algorithm for detecting the motion information (movement vector) has a higher performance and a higher sensitivity, a false image due to interference of a weak brightness signal is detected, and an influence on detection of a motion of the subject increases.

In an imaging device having the imaging system described above, a technology for preventing or reducing the influence of interference is known. For example, in an imaging device described in WO2013-024636, removing an influence due to interference using image processing is described. In an imaging device described in WO2013-146506, crosstalk (interference) is prevented without image processing by forming a light shielding band on a surface of an imaging lens and separating a focal region.

SUMMARY OF THE INVENTION

However, according to the related arts such as WO2013-024636 and WO2013-146506, in a case where it is attempted to increase a degree of removal of an influence of interference, processing and manufacturing costs of lenses or sensors increases or a load of image processing in the imaging device increases, and the interference cannot be completely removed. As a result, in the related art, it is difficult to correctly recognize the motion of the subject by coping with the interference as described above.

The present invention has been made in view of such circumstances, and an object thereof is to provide an imaging device, an imaging method, a program regarding such an imaging device or imaging method, and a non-transitory recording medium, which are capable of easily coping with interference.

In order to achieve the above object, an imaging device according to a first aspect of the present invention comprises an imaging unit that includes an imaging optical system including a first optical system and a second optical system that are provided in different areas and have different imaging characteristics, and a directivity sensor including a plurality of pixels that include photoelectric conversion elements arranged in a two-dimensional shape and pupil-dividing light fluxes that incident via the first optical system and the second optical system, respectively, and selectively receiving the light fluxes using the plurality of pixels; an image reading unit that acquires an image signal of a first image obtained via the first optical system and an image signal of a second image obtained via the second optical system from the directivity sensor; a movement vector detection unit that detects a first movement vector that is a movement vector of a subject in the first image and a second movement vector that is a movement vector of the subject in the second image; a probability calculation unit that calculates a first probability indicating a probability of the first movement vector being a movement vector due to a light flux passing through the first optical system and a second probability indicating a probability of the second movement vector being a movement vector due to a light flux passing through the second optical system; and a movement vector extraction unit that extracts a first true movement vector that is a movement vector due to the light flux passing through the first optical system in the first image and a second true movement vector that is a movement vector due to the light flux passing through the second optical system in the second image, on the basis of the first movement vector, the second movement vector, the first probability and the second probability.

In the imaging device according to the first aspect, since the imaging unit includes the first and second optical systems and the directivity sensor, the first and second true movement vectors are extracted on the basis of the first and second probabilities of the first and second movement vectors in a case where a false movement vector due to interference is detected in addition to the true movement vector of the subject. Therefore, even in a case where there is interference, it is possible to extract the true movement vector and correctly recognize the motion of the subject. Further, it is possible to suppress an increase in cost due to countermeasures for preventing the interference, such as provision of a light shielding band. Thus, in the imaging device according to the first aspect, it is possible to easily cope with the interference.

In the first aspect, the "probability" is probability in which an intensity of a brightness signal which is a base of the movement vector detection is reflected, and can be quantified using a brightness difference of feature points at which the movement vectors are detected. However, the probability may be quantified on the basis of a magnitude of a color difference, a density of nearby feature points, and the like.

In the first aspect and each of the following aspects, "different imaging characteristics" of the optical system includes a case where a focal length (imaging angle of view) of the lens is different as in a wide-angle optical system and a telescopic optical system, a case where a focusing distance is different, or a case where a wavelength of transmitted light is different as in visible light and near infrared ray. Further, in the first aspect, the optical axes of the first and second optical systems may not be the same.

In the imaging device according to a second aspect, in the first aspect, one of the first optical system and the second optical system is a wide-angle optical system, and the other is a telescopic optical system having an optical axis common to the wide-angle optical system. The second aspect is an aspect of the configuration of the optical system in the present invention, and it is possible to acquire the wide-angle image and the telescopic image in which centers of imaging angle of views match each other.

In the imaging device according to the third aspect, in the first or second aspect, the movement vector detection unit detects a first feature point of the subject from a plurality of first images successively acquired and detects a plurality of first movement vectors having different sizes on the basis of the detected first feature point, and detects a second feature point of the subject from a plurality of second images successively acquired and detects a plurality of second movement vectors having different sizes on the basis of the detected second feature point.

In the third aspect, the generation of "a plurality of movement vectors having different sizes" is conceivable to be a situation in which, for example, in a case where the first and second optical systems are the wide-angle optical system and the telescopic optical system, respectively, the size of the true movement vector and the size of the movement vector due to interference are different for the same subject due to a difference in an imaging magnification. In the third aspect, "successively acquiring" a plurality of first and second images refers to sequentially capturing images at time intervals and acquiring a plurality of images. Further, as the feature point, it is possible to detect a point having a large change in brightness of surroundings, such as an edge or a corner of a subject, but the present invention is not limited thereto.

In the imaging device according to a fourth aspect, in the third aspect, the probability calculation unit calculates the first probability for each of the plurality of first movement vectors and calculates the second probability for each of the plurality of second movement vectors. In the third aspect, the probability is calculated for each of the plurality of detected movement vectors in order to detect "the plurality of movement vectors with different sizes" in the fourth aspect.

In the imaging device according to the fifth aspect, in the third or fourth aspect, the probability calculation unit calculates the first probability for each of the plurality of first movement vectors and the second probability for each of the plurality of second movement vectors, on the basis of a brightness signal at the first feature point and a brightness signal at a feature point corresponding to the first feature point among the second feature points. The fifth aspect is an aspect of probability calculation, and the first and second probabilities are calculated on the basis of the brightness signal of the feature point.

In the imaging device according to a sixth aspect, in any one of the first to fifth aspects, the movement vector extraction unit determines that the second movement vector corresponding to one movement vector among the plurality of first movement vectors is a movement vector caused by interference from the first optical system to the second optical system in a case where the first probability for the one movement vector is higher than the second probability for the second movement vector corresponding to the one movement vector, and extracts the one movement vector as the first true movement vector, and determines that the one movement vector is a movement vector caused by interference from the second optical system to the first optical system in a case where the first probability for the one movement vector is equal to or lower than the second probability for the second movement vector corresponding to the one movement vector, and extracts the second movement vector as the second true movement vector.

In the sixth aspect, a true movement vector is extracted. The fact that the first probability for one movement vector among the plurality of first movement vectors is higher than the second probability for the second movement vector corresponding to the one movement vector means that a brightness signal of the second movement vector corresponding to the one vector is weak, and the second movement vector is likely to be caused by interference. Therefore, in the sixth aspect, in such a case, the second movement vector is determined to be due to the interference, and the one movement vector is extracted as the true first movement vector. It is also possible to extract the true second movement vector on the basis of the same determination.

In the imaging device according to a seventh aspect, in any one of the first to sixth aspects, the imaging device further comprises a pan and tilt mechanism that rotates the imaging unit in a horizontal direction and a vertical direction, and the pan and tilt mechanism rotates the imaging unit on the basis of the extracted first true movement vector and the extracted second true movement vector. In the seventh aspect, by rotating the imaging unit on the basis of the first and second true movement vectors, it is possible to perform tracking and imaging corresponding to the motion of the subject even in a case where there is a false movement vector due to interference.

In the imaging device according to an eighth aspect, in the seventh aspect, the pan and tilt mechanism rotates the imaging unit so that a subject detected in the first image is also detected in the second image.

According to a configuration of the first and second optical systems and conditions such as a position and size of the subject in the image, the subject detected in the first image may not be detected in the second image in some cases. In the eighth aspect, by rotating the imaging unit, the subject detected in the first image is also detected in the second image.

In the imaging device according to a ninth aspect, in any one of the first to eighth aspects, the imaging optical system is an imaging optical system in which the first optical system is arranged in a central portion and the second optical system is arranged in an annular shape in a peripheral portion of the first optical system. The ninth aspect is an aspect of an arrangement of the first and second optical systems.

In the imaging device according to a tenth aspect, in any one of the first to ninth aspects, the imaging device further comprises a display unit that displays the first image, the first movement vector, the first probability and the first true movement vector, and the second image, the second movement vector, the second probability and the second true movement vector. In the tenth aspect, a user of the imaging device can visually recognize the movement vector, the probability, or the true movement vector. The vector or the probability may be displayed by a letter, a figure, a symbol, and a combination thereof, and color of the display may be appropriately set.

In the imaging device according to an eleventh aspect, in the tenth aspect, the display unit displays the first movement vector and the first true movement vector according to the first probability, and displays the second movement vector and the second true movement vector according to the second probability. According to the eleventh aspect, the extracted true movement vector and the probability can be easily visually recognized.

In the imaging device according to a twelfth aspect, in any one of the first to eleventh aspects, the imaging device further comprises a recording unit that records the first image, the first movement vector, the first probability and the first true movement vector, and the second image, the second movement vector, the second probability and the second true movement vector. A plurality of pieces of data may be appropriately associated with each other and recorded.

In order to achieve the above object, an imaging method according to a thirteenth aspect of the present invention is an imaging method of an imaging device including an imaging unit that includes an imaging optical system including a first optical system and a second optical system that are provided in different areas and have different imaging characteristics, and a directivity sensor including a plurality of pixels that include photoelectric conversion elements arranged in a two-dimensional shape and pupil-dividing light fluxes that incident via the first optical system and the second optical system, respectively, and selectively receiving the light fluxes using the plurality of pixels, the imaging method comprising: an image reading step of acquiring an image signal of a first image obtained via the first optical system and an image signal of a second image obtained via the second optical system from the directivity sensor; a movement vector detection step of detecting a first movement vector that is a movement vector of a subject in the first image and a second movement vector that is a movement vector of the subject in the second image; a probability calculation step of calculating a first probability indicating a probability of the first movement vector being a movement vector due to a light flux passing through the first optical system and a second probability indicating a probability of the second movement vector being a movement vector due to a light flux passing through the second optical system; and a movement vector extraction step of extracting a first true movement vector that is a movement vector due to the light flux passing through the first optical system in the first image and a second true movement vector that is a movement vector due to the light flux passing through the second optical system in the second image, on the basis of the first movement vector, the second movement vector, the first probability and the second probability.

In the imaging method according to the thirteenth aspect, even in a case where there is interference, it is possible to extract the true movement vector and correctly recognize the motion of the subject, and to suppress an increase in cost due to countermeasures for preventing the interference, as in the first aspect. Thus, in the imaging method according to the thirteenth aspect, it is possible to easily cope with the interference.

In the imaging method according to a fourteenth aspect, in the thirteenth aspect, one of the first optical system and the second optical system is a wide-angle optical system, and the other is a telescopic optical system having an optical axis common to the wide-angle optical system. The fourteenth aspect is an aspect of the configuration of the optical system in the present invention as in the second aspect, and a wide-angle image and a telescopic image of which centers match each other can be acquired.

In the imaging method according to a fifteenth aspect, in the thirteenth or fourteenth aspect, the movement vector detection step includes detecting a first feature point of the subject from a plurality of first images successively acquired and detecting a plurality of first movement vectors having different sizes on the basis of the detected first feature point, and detecting a second feature point of the subject from a plurality of second images successively acquired and detecting a plurality of second movement vectors having different sizes on the basis of the detected second feature point. In the fifteenth aspect, a plurality of movement vectors having different sizes are detected as in the third aspect.

In the imaging method according to a sixteenth aspect, in the imaging method according to the fifteenth aspect, the probability calculation step includes calculating the first probability for each of the plurality of first movement vectors and calculating the second probability for each of the plurality of second movement vectors. In the sixteenth aspect, the probability is calculated for each of the plurality of movement vectors, as in the fourth aspect.

In the imaging method according to a seventeenth aspect, in the fifteenth or sixteenth aspect, the probability calculation step includes calculating the first probability for each of the plurality of first movement vectors and the second probability for each of the plurality of second movement vectors, on the basis of a brightness signal at the first feature point and a brightness signal at a feature point corresponding to the first feature point among the second feature points. In the seventeenth aspect, the first and second probabilities are calculated on the basis of the brightness signal of the feature point, as in the fifth aspect.

In the imaging method according to an eighteenth aspect, in any one of the thirteenth to seventeenth aspects, the movement vector extraction step includes determining that the second movement vector corresponding to one movement vector among the plurality of first movement vectors is a movement vector caused by interference from the first optical system to the second optical system in a case where the first probability for the one movement vector is higher than the second probability for the second movement vector corresponding to the one movement vector, and extracting the one movement vector as the first true movement vector, and determining that the one movement vector is a movement vector caused by interference from the second optical system to the first optical system in a case where the first probability for the one movement vector is equal to or lower than the second probability for the second movement vector corresponding to the one movement vector, and extracting the second movement vector as the second true movement vector. In the eighteenth aspect, a true movement vector is extracted as in the sixth aspect.

In the imaging method according to a nineteenth aspect, in any one of the thirteenth to eighteenth aspects, the imaging method further comprises an imaging unit rotation step of rotating the imaging unit on the basis of the extracted first true movement vector and the extracted second true movement vector, and the image reading step, the movement vector detection step, the probability calculation step, and the movement vector extraction step are repeated while rotating the imaging unit through the imaging unit rotation step. In the nineteenth aspect, by repeating the image reading step, the movement vector detection step, the probability calculation step, and the movement vector extraction step are repeated while rotating the imaging unit through the imaging unit rotation step, it is possible to image the subject while successively tracking the subject.

In the imaging method according to a twentieth aspect, in the nineteenth aspect, the imaging unit rotation step includes rotating the imaging unit so that the subject detected in the first image is also detected in the second image. In the twentieth aspect, the imaging unit is rotated so that the subject detected in the first image is also detected in the second image, as in the eighth aspect.

A twenty-first aspect of the present invention is a program that causes an imaging device to execute the imaging method according to any one of the thirteenth to twentieth aspects. The program according to the twenty-first aspect may be stored in a memory incorporated in an imaging device or a lens device, such as a read only memory (ROM) or an electronically erasable and programmable read only memory (EEPROM), or may be recorded on various magneto-optical recording media (non-transitory recording media) such as a compact disk (CD), a digital versatile disk (DVD), a Blue-ray Disc (BD), a hard disk, or a semiconductor memory to be used.

A twenty-second aspect of the present invention is a non-transitory recording medium on which a computer-readable code of the program according to the twenty-first aspect is recorded. Examples of the non-transitory recording medium according to the twenty-second aspect include various magneto-optical recording media such as a CD, a DVD, a BD, a hard disk, and a semiconductor memory.

According to the imaging device, the imaging method, the program, and the non-transitory recording medium of the present invention, it is possible to easily cope with the interference.

DESCRIPTION OF THE PREFERRED EMBODIMENTS

Hereinafter, embodiments of an imaging device, an imaging method, a program, and a non-transitory recording medium according to the present invention will be described with reference to the accompanying drawings.

<Configuration of Imaging Device>

Figure 1:
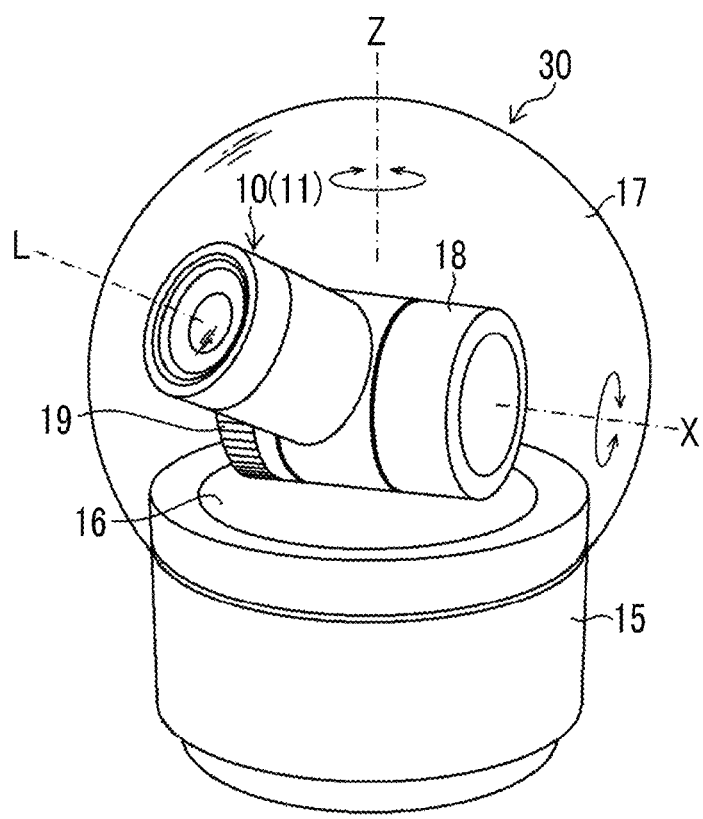
FIG. 1 is a perspective view illustrating an appearance of an imaging device according to an embodiment of the present invention.

FIG. 1 is a perspective view illustrating an imaging device 30 according to an embodiment of the present invention. In the imaging device 30 illustrated in FIG. 1, a holding unit 18 including a gear 19, and an imaging unit 10 attached to the holding unit 18 are fixedly mounted on a pedestal 16 provided on a device body 15. The imaging unit 10 includes an imaging optical system 11, and an imaging element 24 (see FIGS. 2 to 5) as a directivity sensor. The pedestal 16 is provided to be freely rotatable around an axis in a vertical direction Z of the device body 15, and a pan operation around the axis in a vertical direction Z is performed by a pan and tilt mechanism 52 and a pan driving unit 54 (see FIG. 6). The gear 19 is provided coaxially with an axis in a horizontal direction X and, by transferring driving force from the pan and tilt mechanism 52 and the tilt driving unit 56 (see FIG. 6) via the gear 19, the imaging unit 10 is rotated in a vertical direction and a tilt operation is performed. The imaging unit 10, the holding unit 18 including the gear 19 and the pedestal 16 are covered with a dome cover 17 for dustproofing and dripproofing.

<Configuration of Imaging Unit>

Figure 2:
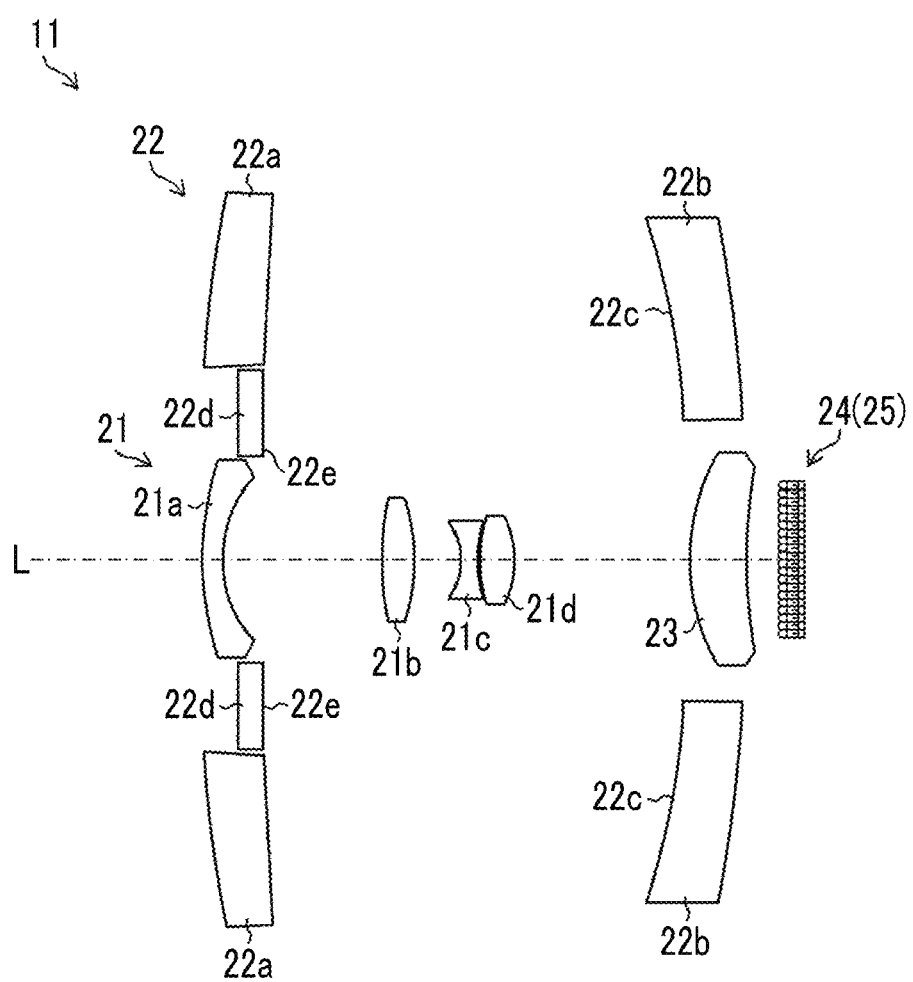
FIG. 2 is a cross-sectional view illustrating a configuration of an imaging optical system and an imaging element according to an embodiment of the present invention.

FIG. 2 is a diagram illustrating a cross-sectional configuration of the imaging optical system 11 and the imaging element 24.

The imaging optical system 11 includes a first optical system 21 and a second optical system 22 having different characteristics. In particular, in this embodiment, for example, the first optical system 21 and the second optical system 22 are configured by optical systems having different focal lengths. That is, the imaging optical system 11 of this embodiment includes the first optical system 21 configured by a "wide-angle imaging lens group" and the second optical system 22 configured by a "telescopic imaging lens group", and can capture a wide-angle image and a telescopic image simultaneously using the imaging element 24.

The first optical system 21 illustrated in FIG. 2 includes a first wide-angle lens 21a, a second wide-angle lens 21b, a third wide-angle lens 21c, a fourth wide-angle lens 21d, and a common lens 23 which are arranged on the same optical axis L. On the other hand, the second optical system 22 includes a first telescopic lens 22a, a first telescopic reflector 22b provided with a first telescopic reflecting mirror 22c, a second telescopic reflector 22d provided with a second telescopic reflecting mirror 22e, and the common lens 23. The first optical system 21 (particularly, the first wide-angle lens 21a, the second wide-angle lens 21b, the third wide-angle lens 21c, and the fourth wide-angle lens 21d) of this example forms a central optical system. On the other hand, the second optical system 22 (particularly, the first telescopic lens 22a, the first telescopic reflector 22b, the first telescopic reflecting mirror 22c, the second telescopic reflector 22d, and the second telescopic reflecting mirror 22e) of this example is provided around the central optical system formed by the first optical system 21, and forms a concentric circle together with the central optical system formed by the first optical system 21. The common lens 23 is arranged on an optical axis L and is shared between the first optical system 21 and the second optical system 22.

As described above, the imaging optical system 11 includes the first optical system 21 and the second optical system 22 having a common optical axis L and having different focal lengths and imaging angle of views.

The imaging element 24 is configured by two-dimensionally arranging a plurality of light reception sensors 25 as directivity sensors in a direction perpendicular to the optical axis L. In particular, the imaging element 24 of this embodiment constitutes a directivity sensor that simultaneously receives the wide-angle image light incident via the first optical system 21 and the telescopic image light incident via the second optical system 22, and is capable of outputting an image signal of a first image (also referred to as a "first image signal") for generating the first image (here, a wide-angle image) and an image signal of a second image (also referred to as a "second image signal") for generating a second image (here, a telescopic image). That is, the imaging element 24 of this embodiment includes a plurality of light reception sensors 25 provided corresponding to each of the first optical system 21 and the second optical system 22, and the plurality of light reception sensors 25 pupil-divide and selectively receive light passing through the corresponding optical system of the first optical system 21 and the second optical system 22.

Figure 3:
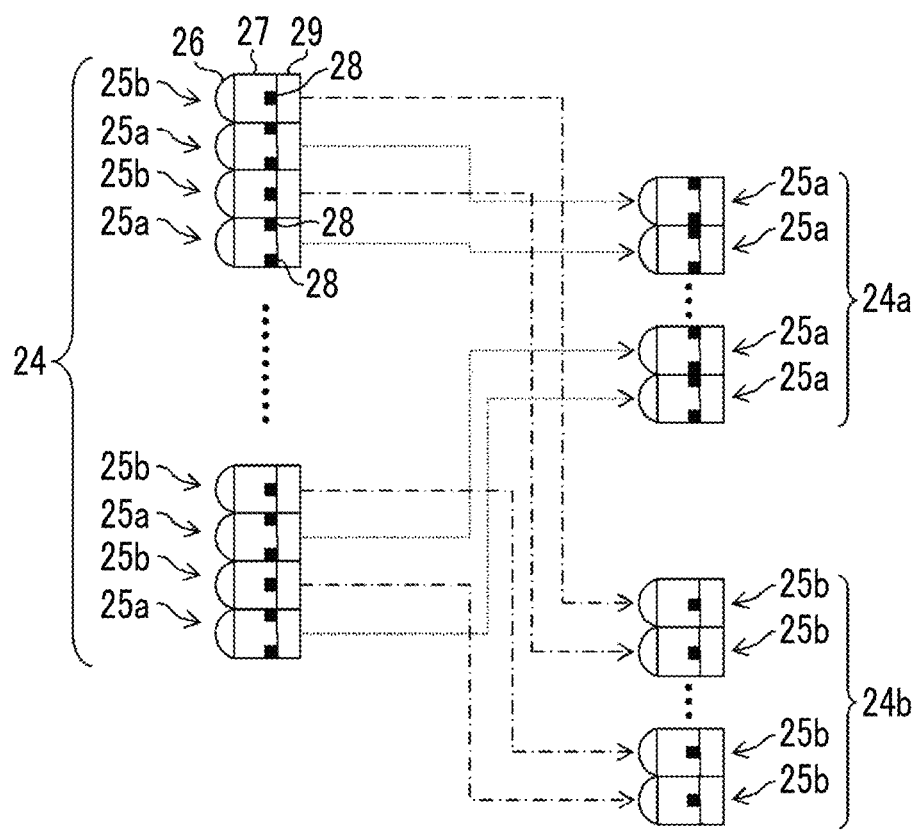
FIG. 3 is a cross-sectional view illustrating a detailed configuration of the imaging element illustrated in FIG. 2.

FIG. 3 is a diagram illustrating a detailed cross-sectional configuration example of the imaging element 24 illustrated in FIG. 2.

The plurality of light reception sensors 25 (photoelectric conversion elements) constituting the imaging element 24 of this example includes "first light reception sensors 25a for a wide-angle image" corresponding to the first optical system 21 and "second light reception sensors 25b for a telescopic image" corresponding to the second optical system 22. The first light reception sensors 25a and the second light reception sensors 25b are two-dimensionally alternately arranged to constitute pixels of the imaging element 24. The plurality of first light reception sensors 25a included in the imaging element 24 constitute a "first sensor group 24a that selectively receives light passing through the first optical system 21", and output an imaging signal for generating a wide-angle image. Further, the plurality of second light reception sensors 25b included in the imaging element 24 constitute a "second sensor group 24b that selectively receives light passing through the second optical system 22", and output an imaging signal for generation a telescopic image. Thus, the imaging element 24 of this example includes the first sensor group 24a corresponding to the first optical system 21 and the second sensor group 24b corresponding to the second optical system 22.

Each of the first light reception sensor 25a and the second light reception sensor 25b includes a microlens 26, a photodiode 29 and an interlayer 27 on which the microlens 26 and the photodiode 29 are arranged. A light shielding mask 28 is provided in the interlayer 27. In the first light reception sensor 25a, the light shielding mask 28 is arranged in a peripheral portion of a light reception surface of the photodiode 29. In the second light reception sensor 25b, the light shielding mask 28 is arranged in a central portion of the light reception surface of the photodiode 29. The arrangement of the light shielding mask 28 is determined according to which of the first optical system 21 and the second optical system 22 the light shielding mask 28 corresponds to. Each light shielding mask 28 blocks light from the non-corresponding optical system and causes light from the corresponding optical system to be received by the photodiode 29 without blocking the light from the corresponding optical system.

In this example, a plurality of light reception sensors that pupil-divide and selectively receive the light passing through the corresponding optical system of the first optical system 21 and the second optical system 22 are realized by the light reception sensors 25 including the light shielding mask 28. The present invention is not limited to this scheme, and pupil division may be realized by other means. For example, the light shielding mask 28 may be provided in a stage before the microlens 26 (for example, between the microlens 26 and the common lens 23 (see FIG. 3)), or light shielding means (for example, a liquid crystal shutter) other than the light shielding mask 28 may be used.

A member other than the light shielding mask 28 may be provided on the interlayer 27, and a wiring or a circuit or the like, for example, may be provided on the interlayer 27.

The imaging element 24 is provided with a color filter arrangement including color filters (also referred to as "optical filters"; not illustrated) for R (red), G (green), and B (blue) arranged with respect to each of the light reception sensors 25. A wide-angle color image and a telescopic color image can be obtained by the image generation unit 32 (see FIG. 6) performing a demosaicing process ("synchronization process") on an image (that is, a mosaic image) of each color that is obtained corresponding to a color arrangement pattern of the color filter arrangement.

Figure 4:
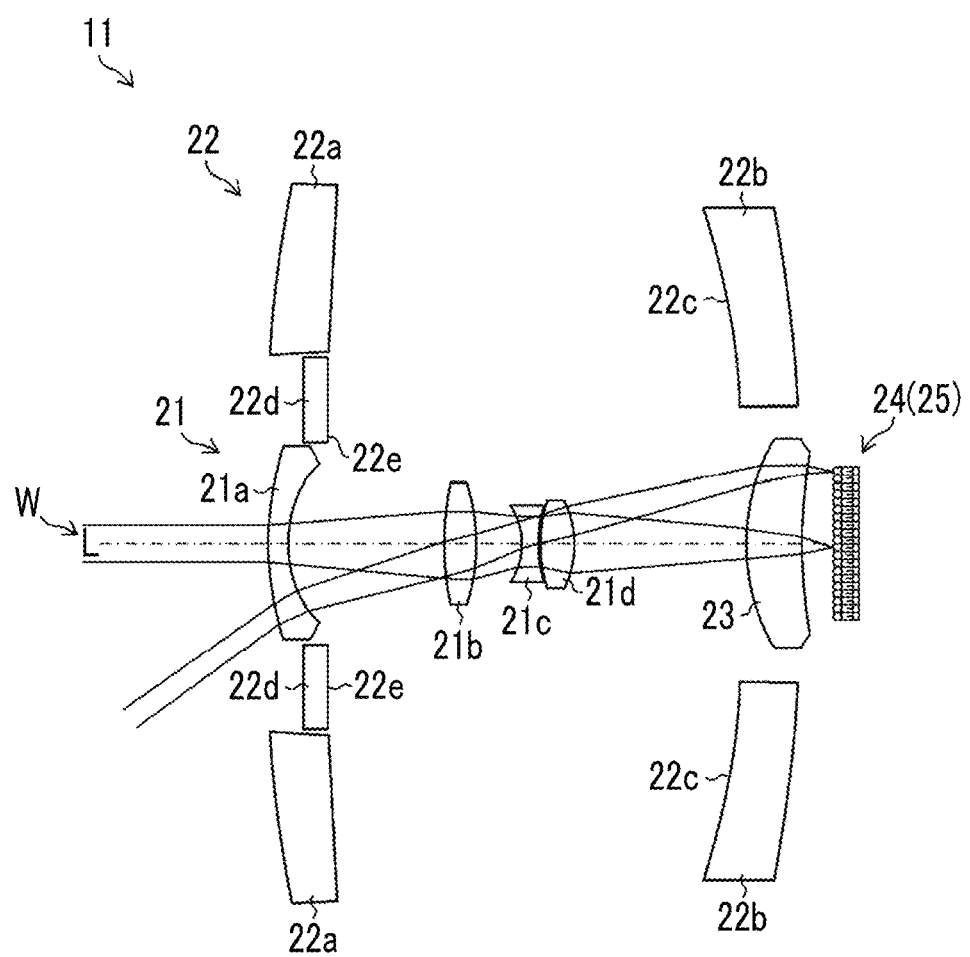
FIG. 4 is a diagram illustrating an optical path of wide-angle image light incident on the imaging optical system (particularly, a first optical system) and the imaging element (particularly, a first sensor group) illustrated in FIG. 2.

FIG. 4 is a diagram illustrating optical paths of wide-angle image light W incident on the first optical system 21 and the first sensor group 24a in the imaging optical system 11 illustrated in FIG. 2 and the imaging element 24 illustrated in FIG. 3. In this embodiment, the wide-angle image light W sequentially passes through the first wide-angle lens 21a, the second wide-angle lens 21b, the third wide-angle lens 21c, the fourth wide-angle lens 21d, and the common lens 23 of the first optical system 21, and forms a wide-angle image on the first sensor group 24a on the imaging element 24.

Figure 5:
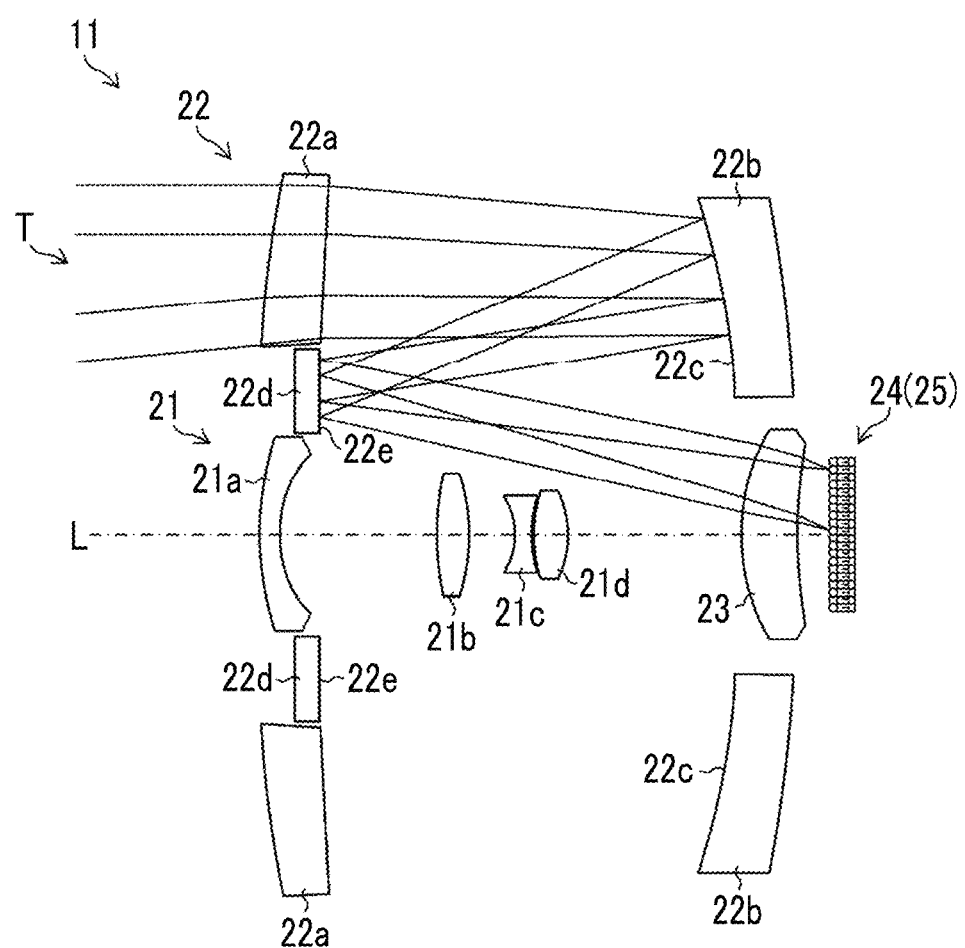
FIG. 5 is a diagram illustrating optical paths of telescopic image light incident on the imaging optical system (particularly, a second optical system) and the imaging element (particularly, a second sensor group) illustrated in FIG. 2.

FIG. 5 is a diagram illustrating an optical path of telescopic image light T incident on the second optical system 22 and the second sensor group 24b in the imaging optical system 11 illustrated in FIG. 2 and the imaging element 24 illustrated in FIG. 3. In this embodiment, the telescopic image light T passes (is transmitted) through the first telescopic lens 22a, is reflected by each of the first telescopic reflecting mirror 22c and the second telescopic reflecting mirror 22e, passes through the common lens 23, and then form a telescopic image on the second sensor group 24b on the imaging element 24. Thus, the light is reflected by each of the first telescopic reflecting mirror 22c and the second telescopic reflecting mirror 22e and the optical path is folded, such that a length in the optical axis L of the second optical system 22 for capturing a telescopic image with a long focal length can be shortened.

Figure 6:
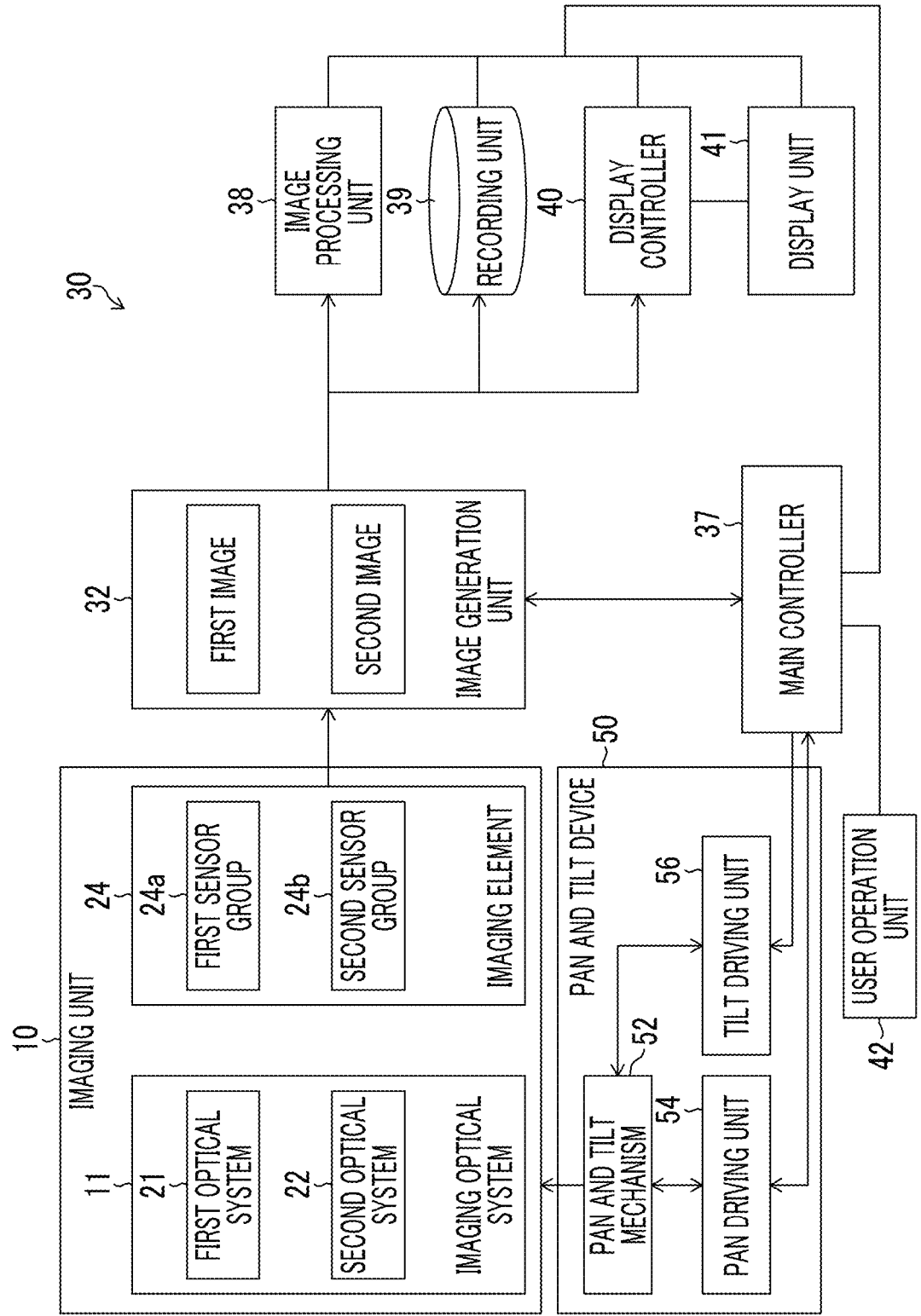
FIG. 6 is a block diagram illustrating a functional configuration of an imaging device according to an embodiment of the present invention.

FIG. 6 is a block diagram illustrating a functional configuration example of the imaging device 30 according to this embodiment.

The imaging device 30 of this example includes the image generation unit 32, a main controller 37, an image processing unit 38, a recording unit 39, a display controller 40, a display unit 41, and a user operation unit 42, in addition to the imaging optical system 11 including the first optical system 21 and the second optical system 22 and the imaging element 24 including the first sensor group 24a and the second sensor group 24b described above.

The image generation unit 32 (also referred to as "image reading unit") generates image data of a first image (also referred to as "first image data") on the basis of the first image signal output from the first sensor group 24a, and generates image data of a second image (also referred to as "second image data") on the basis of the second image signal output from the second sensor group 24b. The first image data and the second image data generated in the image generation unit 32, for example, are sent to the main controller 37 that controls the image processing unit 38, the recording unit 39, the display controller 40, and the image generation unit 32 provided in subsequent stages.

The image processing unit 38 including a movement vector detection unit, a probability calculation unit, and a movement vector extraction unit (not illustrated) detects a subject in the first image and the second image, and performs movement vector detection of subject, probability calculation, and true movement vector extraction on the basis of a result of the detection. A process of the image processing unit 38 will be described below in detail.

The recording unit 39 records the first and second image data, the movement vector, the probability, and the true movement vector in association with each other.

The display controller 40 displays the wide-angle image of the first image, the telescopic image of the second image, the movement vector, the probability, and the true movement vector reproduced on the basis of the first image data and second image data that have been received, on the display unit 41.

A pan and tilt device (electric pan head) 50 includes, for example, a pan and tilt mechanism 52 that rotates the imaging unit 10 illustrated in FIG. 1 in a horizontal direction (that is, a pan direction) and a vertical direction (that is, a tilt direction) with respect to the device body 15, the pan driving unit 54, and the tilt driving unit 56. The pan and tilt mechanism 52 includes a home position sensor that detects a reference position of a rotation angle (pan angle) in the pan direction, and a home position sensor that detects a reference position of an inclination angle (that is, a tilt angle) in the tilt direction.

Each of the pan driving unit 54 and the tilt driving unit 56 includes a stepping motor and a motor driver, and outputs driving force to the pan and tilt mechanism 52 to drive the pan and tilt mechanism 52.

The main controller 37 is connected to the imaging unit 10, the image generation unit 32, the image processing unit 38, the recording unit 39, the display controller 40, the display unit 41, the user operation unit 42, the pan and tilt device 50, and respective other units constituting the imaging device 30, and controls processing functions of each unit. The user operation unit 42 is operated by a user, various instruction commands are input to the user operation unit 42, various instruction commands input to the user operation unit 42 are transmitted to the main controller 37, and the main controller 37 can control the respective units of the imaging device 30 on the basis of the instruction commands from the user operation unit 42.

<Wide-Angle Image and Telescopic Image>

Figure 7A:
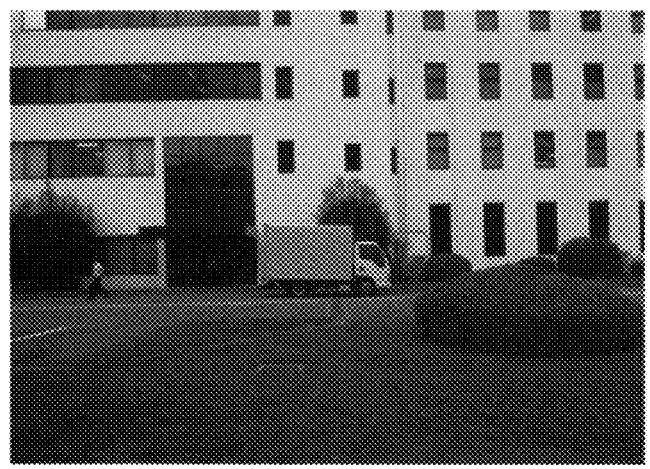
FIGS. 7A and 7B are diagrams illustrating an example of an ideal wide-angle image and an ideal telescopic image.
Figure 7B:
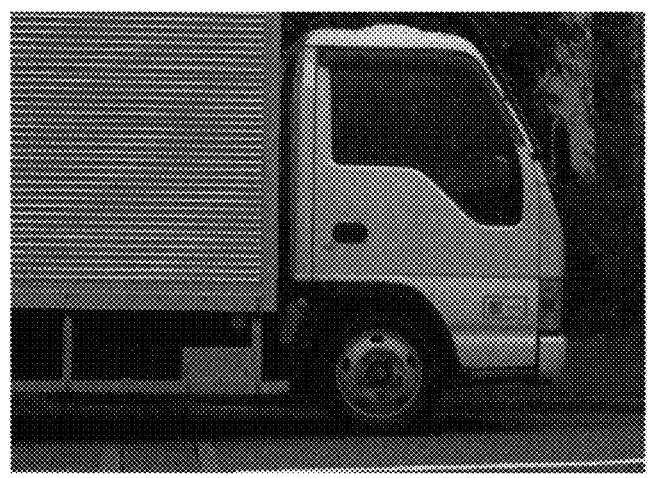

Next, the wide-angle image and the telescopic image will be described. FIGS. 7A and 7B are diagrams illustrating examples of the wide-angle image and the telescopic image. FIG. 7A illustrates the wide-angle image and FIG. 7B illustrates the telescopic image. In FIGS. 7A and 7B, an example of an ideal wide-angle image and an ideal telescopic image in which no interference occurs between the wide-angle image and the telescopic image is illustrated.

<Wide-Angle Image and Telescopic Image in Case where there is Interference>

Figure 8A:
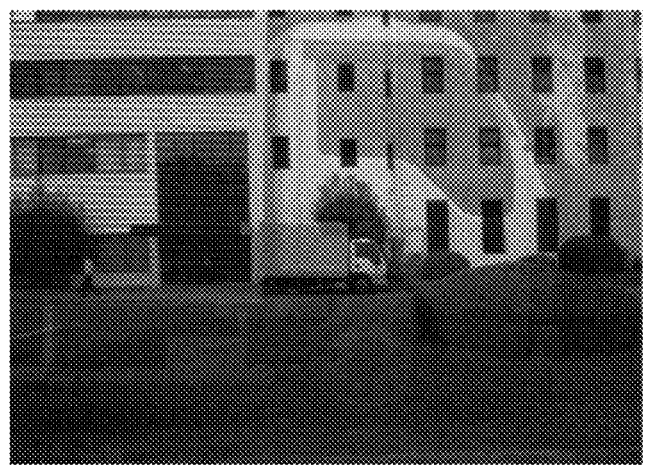
FIGS. 8A and 8B are diagrams illustrating examples of a wide-angle image and a telescopic image in which interference occurs.
Figure 8B:

On the other hand, an example of the wide-angle image and the telescopic image in a case where there is interference are illustrated in FIGS. 8A and 8B. FIG. 8A illustrates the wide-angle image and FIG. 8B illustrates the telescopic image. As illustrated in FIG. 8A, the telescopic image interferes in the wide-angle image, and a false image due to interference (here, a large image of the truck) appears faintly in the image, in addition to an original subject image (here, a small truck at a center of the image). On the other hand, as illustrated in FIG. 8B, the telescopic image interferes in the wide-angle image, and a false image (here, a small image of a large truck) due to interference appears faintly at a center of the image, in addition to an original subject (here, the large truck at a center of the image). The true movement vector extraction to be shown below will be described in an example of such a situation.

<True Movement Vector Extraction Based on Probability (Part 1)>

True movement vector extraction based on the probability will be first conceptually described. Here, in order to simplify the description, only the truck in FIGS. 7A and 7B and FIGS. 8A and 8B is considered as a subject, and this truck travels from left to right in FIGS. 7A and 7B and FIGS. 8A and 8B.

Figure 9A:
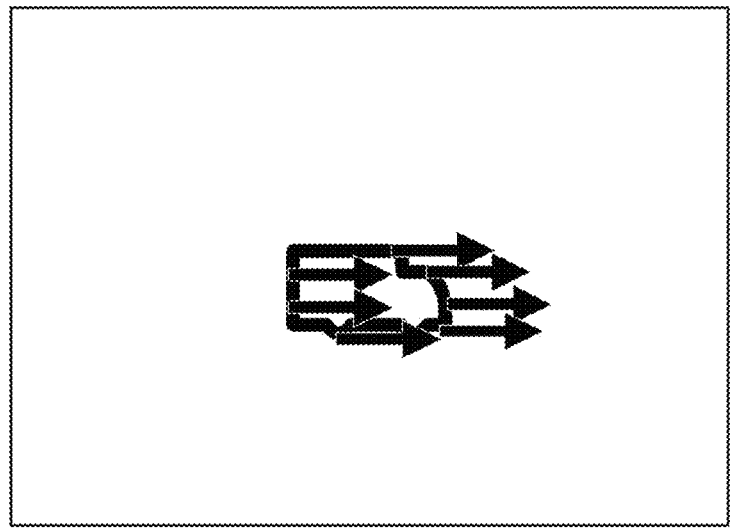
FIGS. 9A and 9B are conceptual diagrams illustrating a process of extracting a true movement vector.

FIG. 9A is a diagram illustrating an outline of a subject image in the wide-angle image (a subject image due to interference of the telescopic image is not illustrated for convenience of description), and illustrates outline of the subject, and a first movement vector (arrows in FIG. 9A) detected for feature points present on the outline. A start point of each movement vector is the feature point. Here, a "probability" of the movement vector is indicated by a thickness of the movement vector. Here, the "probability" is probability in which an intensity of a brightness signal which is a base of the movement vector detection is reflected, and can be quantified using a brightness difference of feature points at which the movement vectors are detected. However, the probability may be quantified on the basis of a magnitude of a color difference, a density of nearby feature points, and the like.

Figure 9B:
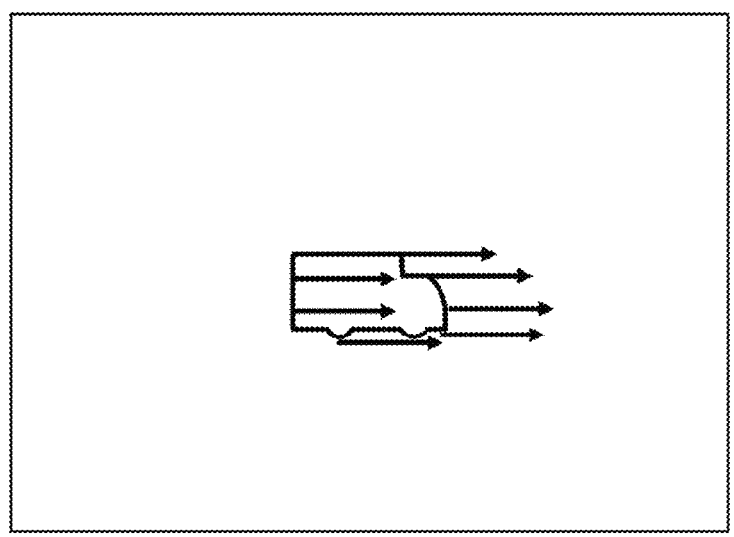

FIG. 9B is a diagram illustrating a state in which the subject image of the wide-angle image interferes in the telescopic image (for the convenience of description, a true subject image in the telescopic image is not illustrated). Since the subject image in FIG. 9B is an image due to interference and its brightness is low, the thickness of the movement vector indicating the "probability" is also smaller than that of the movement vector illustrated in FIG. 9A.

Figure 10A:
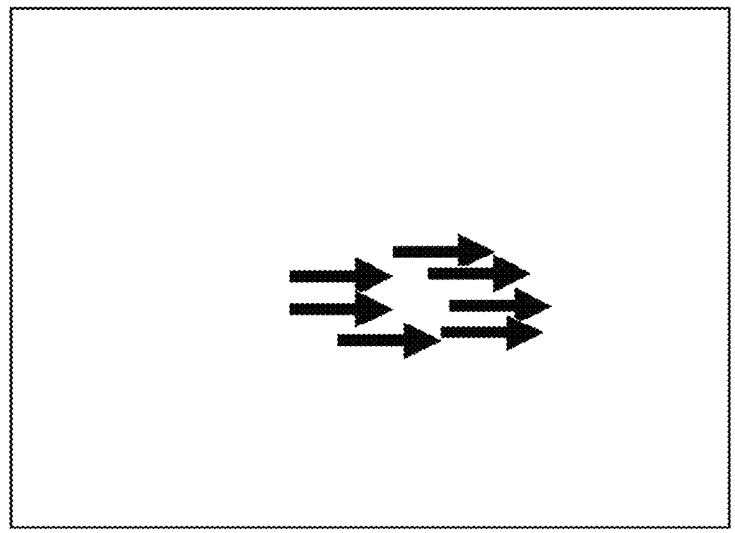
FIGS. 10A and 10B are other conceptual diagrams illustrating the process of extracting a true movement vector.
Figure 10B:

In this embodiment, since the optical axes of the first optical system 21 and the second optical system 22 are common to L, a position of a false image of the subject due to the interference in FIG. 9B is the same position of the subject image in FIG. 9A. Therefore, in a case where, as a result of comparing the wide-angle image of FIG. 9A with the telescopic image of FIG. 9B, there are movement vectors having the same direction and the same size at the same position in these images, the movement vector with a low probability is determined to be a false movement vector due to the interference. FIGS. 10A and 10B illustrate a result of extracting only the true movement vector in this manner.

FIG. 10A is a diagram illustrating true movement vectors extracted from the wide-angle image in FIG. 9A. In the example illustrated in FIGS. 9A and 9B and FIGS. 10A and 10B, since only the subject in the wide-angle image and the interference of the telescopic image from the wide-angle image are described, the true movement vector corresponding to the wide-angle image is not extracted from the telescopic image (not illustrated) in FIG. 9B, as illustrated in FIG. 10B.

<True Movement Vector Extraction Based on Probability (Part 2)>

Figure 11A:
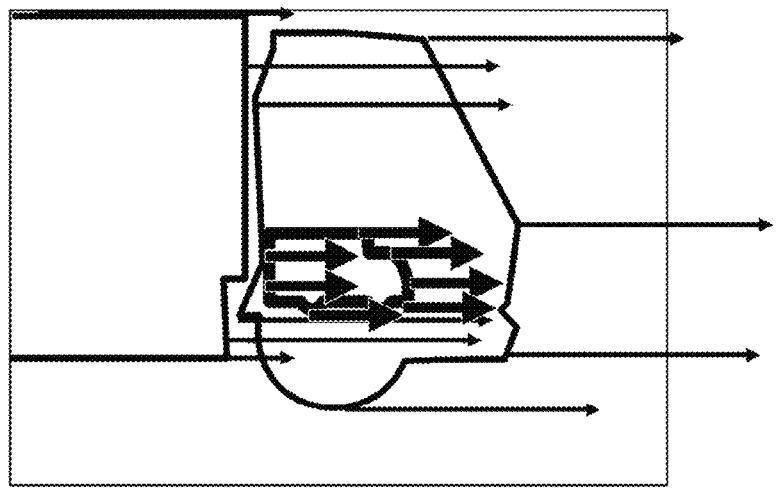
FIGS. 11A and 11B are other conceptual diagrams illustrating the process of extracting a true movement vector.
Figure 11B:
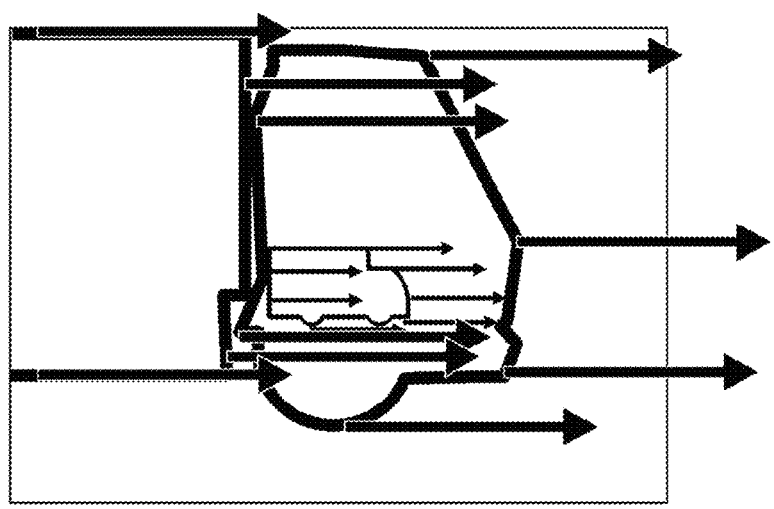

Next, the true movement vector extraction in a case where a false image due to interference is generated in the wide-angle image and the telescopic image will be described. FIG. 11A is a diagram illustrating a subject image (indicated by a contour) extracted from the wide-angle image and detected movement vectors, and illustrates a state in which a false subject image (a large truck image) due to interference of the telescopic image is generated in addition to an original subject image (a small truck image at a center of FIG. 11A). That is, FIG. 11A is a diagram corresponding to FIG. 8A. On the other hand, FIG. 11B is a diagram illustrating a subject image (indicated by a contour) extracted from the telescopic image and detected movement vectors, and illustrates a state in which a false subject image (a small truck image at a center of FIG. 11B) due to interference of the wide-angle image is generated in addition to an original subject image (a large truck image). That is, FIG. 11B is a diagram corresponding to FIG. 8B.

In FIGS. 11A and 11B, the "probability" of the movement vector is indicated by the thickness of the vector, similarly to FIGS. 9A and 9B.

Figure 12A:
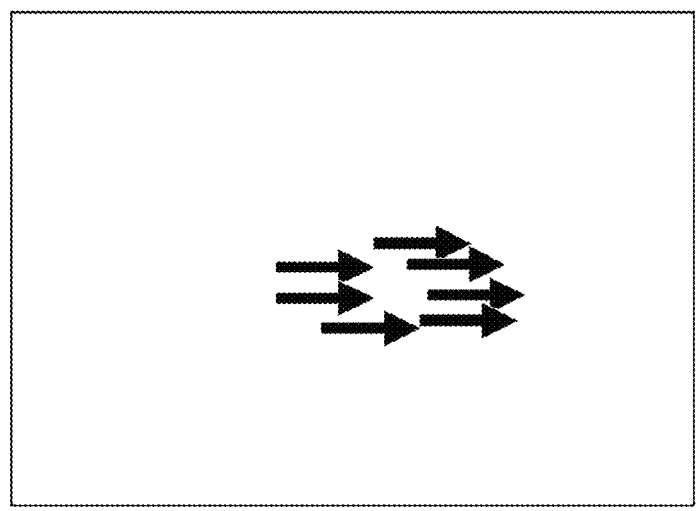
FIGS. 12A and 12B is another conceptual diagram illustrating the process of extracting a true movement vector.
Figure 12B:
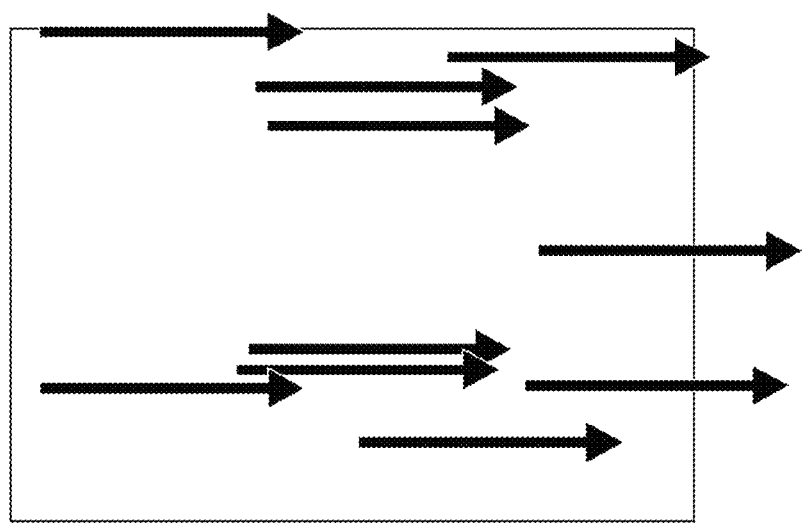

In cases illustrated in FIGS. 11A and 11B, in a case where there are movement vectors having the same direction and the same size at the same position in the image, movement vectors with the low probability are determined to be false movement vectors due to interference, and true movement vectors is extracted, similar to FIGS. 9A and 9B. FIGS. 12A and 12B illustrate the movement vectors extracted in this manner. FIG. 12A illustrates the true movement vectors extracted from the wide-angle image, and FIG. 12B illustrates the true movement vectors extracted from the telescopic image.

<True Movement Vector Extraction and Subject Tracking>

Figure 13:
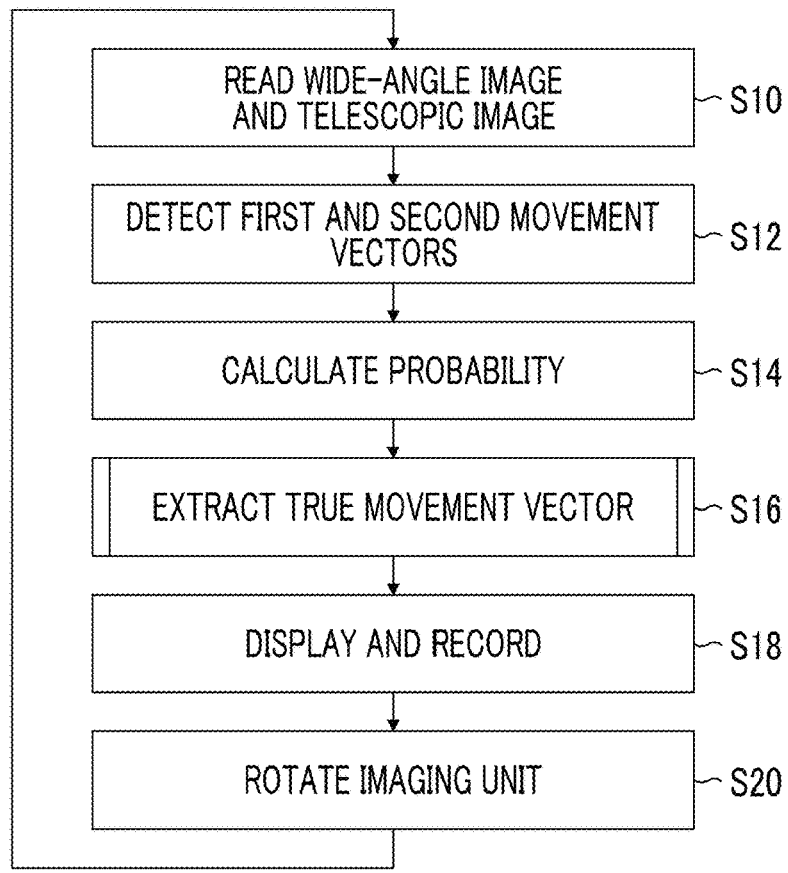
FIG. 13 is a flowchart illustrating an overview of the process of extracting a true movement vector.

Next, a process of true movement vector extraction and subject tracking in the imaging device 30 will be described in detail. FIG. 13 is a flowchart illustrating a true movement vector extraction process. A program that performs such process can be stored in, for example, the main controller 37 or the recording unit 39, and a computer-readable code of the program can be recorded in a non-transitory recording medium such as a CD, a DVD, a BD, a hard disk, or a semiconductor memory and used.

First, the image generation unit 32 (see FIG. 6) acquires an image signal indicating the wide-angle image of the first image and an image signal indicating the telescopic image of the second image from the imaging element 24, and generates a wide-angle image and a telescopic image (step S10; image reading step). Then, the process proceeds to step S12, in which movement vectors of the subject are detected for each of the wide-angle image and the telescopic image (movement vector detection step). In a case where the subject detected in the wide-angle image in this process is not detected in the telescopic image, the imaging unit 10 may be rotated by the pan and tilt device 50, as necessary.

The movement vector detection from the wide-angle image in the movement vector detection step in step S12 will be described. First, a plurality of wide-angle images are acquired at a time interval, and feature points (first feature points) of the subject are detected in each of the plurality of wide-angle images (first images). The movement vectors (first movement vectors) in the wide-angle image are detected on the basis of a difference between the corresponding feature points. Similarly, feature points (second feature points) of the subject in the telescopic images are detected from a plurality of telescopic images (second images) acquired at a time interval, and the movement vectors (second movement vectors) in the telescopic image are detected.

In this embodiment, since an angle of view is different between the wide-angle image and the telescopic image, a size of the object is different therebetween, and since interference occurs between the wide-angle image and the telescopic image, a plurality of movement vectors having different sizes are detected for the first and second movement vectors in the movement vector detection step of step S12.

Figure 15A:
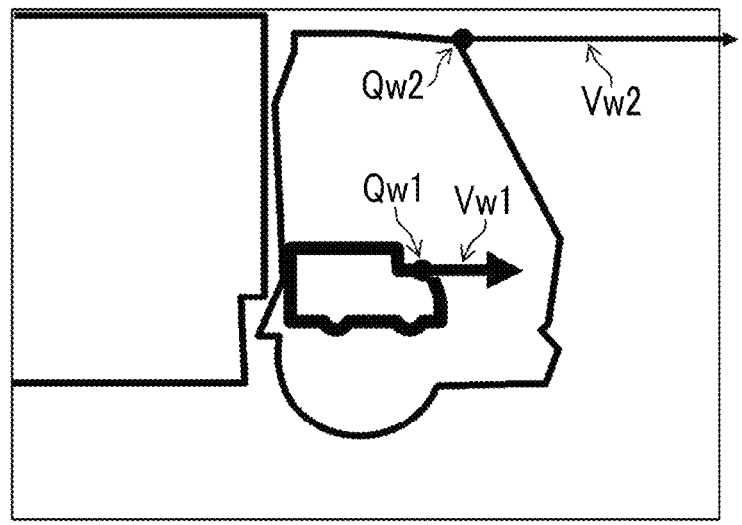
FIGS. 15A and 15B are other conceptual diagrams illustrating the process of extracting a true movement vector.
Figure 15B:
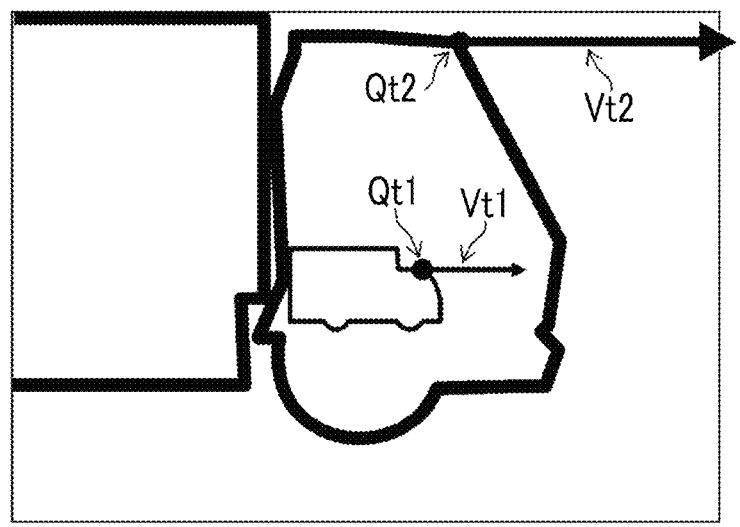

The process then proceeds to step S14 to calculate the probability of the movement vector (a probability calculation step). Here, a case where two movement vectors are detected in each of the wide-angle image (FIG. 15A) and the telescopic image (FIG. 15B) as illustrated in FIGS. 15A and 15B in order to simplify the description will be described. Meanings of symbols in FIGS. 15A and 15B are as follows.

Qw1 and Qw2: Feature points (first feature points) in the wide-angle image;

Vw1 and Vw2: Movement vectors (first movement vectors) for the feature points Qw1 and Qw2;

Qt1 and Qt2: Feature points (second feature points) in the telescopic image;

Vt1 and Vt2: Movement vectors (second movement vector) for the feature points Qt1 and Qt2.

The movement vectors Vw1 and Vw2 are movement vectors due to a light flux passing through the wide-angle optical system, and first probabilities that are corresponding probabilities are Pw1 and Pw2, respectively. The movement vectors Vt1 and Vt2 are the movement vectors due to a light flux passing through the telescopic optical system, and second probabilities that are corresponding probabilities are Pt1 and Pt2, respectively.

In step S14, the probabilities Pw1 and Pw2 of the movement vectors Vw1 and Vw2 of the subject in the wide-angle image being movement vectors due to the light flux passing through the wide-angle optical system (the first optical system 21), and the probabilities Pt1 and Pt2 of the movement vectors Vt1 and Vt2 of the subject in the telescopic image being movement vectors due to the light flux passing through the telescopic optical system (the second optical system 22) are calculated.

For example, the probabilities Pw1 and Pt1 can be calculated on the basis of the brightness signal at the feature point Qw1 in the wide-angle image and the brightness signal at the feature point Qt1 in the telescopic image corresponding to the feature point Qw1. Similarly, the probabilities Pw2 and Pt2 can be calculated on the basis of the brightness signal at the feature point Qw2 in the wide-angle image and the brightness signal at the feature point Qt2 in the telescopic image corresponding to the feature point Qw2.

Figure 14:
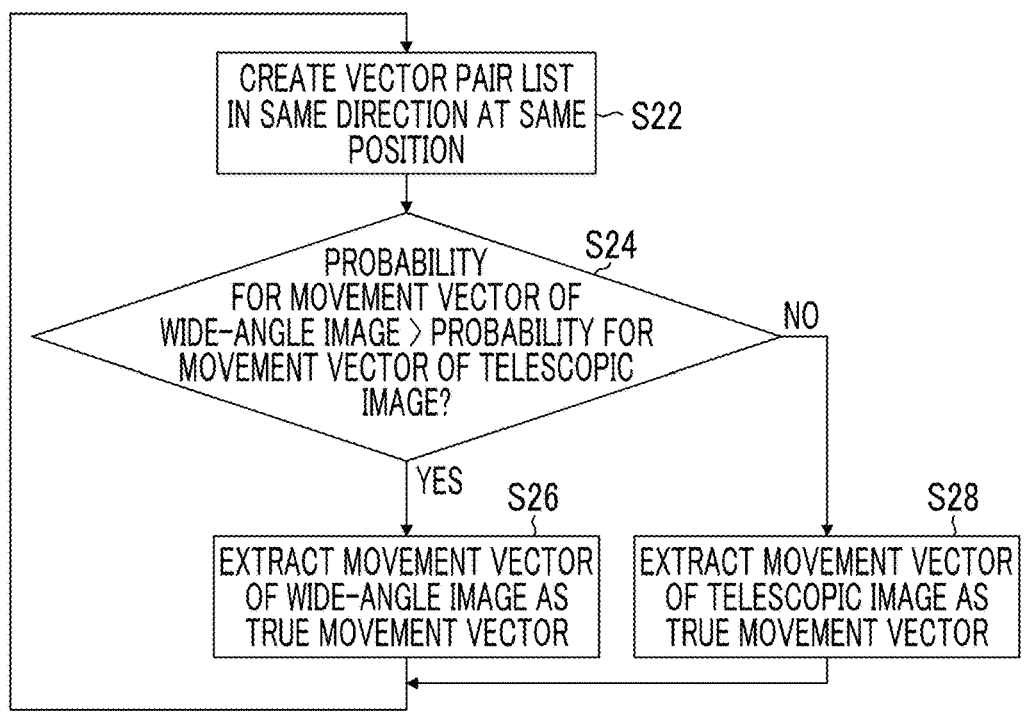
FIG. 14 is a flowchart illustrating details of the process of extracting a true movement vector.

In a case where the calculation of the probabilities in step S14 ends, the process proceeds to step S16 to extract a true movement vector (a movement vector extraction step). The process of step S16 will be described in detail with reference to FIG. 14.

First, in step S22, a candidate list of movement vectors is created. In this candidate list, vectors having the same direction at the same position are extracted from the movement vectors (Vw1 and Vw2 in the example of FIGS. 15A and 15B) of the wide-angle image and the movement vectors (Vt1 and Vt2) of the telescopic image, and a list of pairs is created. In the example of FIGS. 15A and 15B, (Vw1, Vt1) and (Vw2, Vt2) are listed.

Since the probability is calculated for each of the movement vectors listed in step S22, the probabilities of the listed movement vectors are compared in step S24. Specifically, it is determined "whether or not the probability for the movement vector in the wide-angle image is higher than the probability of the movement vector in the telescopic image corresponding to the movement vector". In the example of FIGS. 15A and 15B, the probability Pw1 for the movement vector Vw1 is compared with the probability Pt1 for the movement vector Vt1.

In a case where the determination in step S24 is positive (a determination result is YES), the process proceeds to step S26 in which the movement vector of the wide-angle image is extracted as a true movement vector. In a case where the determination is negative (the determination result is NO), the process proceeds to step S28 in which the movement vector of the telescopic image is extracted as a true movement vector. In the example of FIGS. 15A and 15B, since Pw1>Pt1, the determination in step S24 is positive, the movement vector Vt1 is determined to be a false movement vector due to interference from the first optical system 21 to the second optical system 22, and the movement vector Vw1 is extracted as a true movement vector. Further, since Pw2≤Pt2, the movement vector Vw2 is determined to a false movement vector due to interference from the second optical system 22 to the first optical system 21, and the movement vector Vt2 is extracted as a true movement vector.

By repeating the process from step S22 to step S28 in this manner, a true movement vector can be extracted. In a case where the extraction of the true movement vector for all the listed movement vectors is completed, the flow returns to the flowchart of FIG. 13 and proceeds to step S18.

In step S18, the movement vector, the true movement vector, and the probability are displayed on the display unit 41 in association with the feature point and recorded on the recording unit 39. For example, the movement vector, the true movement vector, and the probability are displayed as illustrated in FIGS. 15A and 15B, and this information is recorded. In FIGS. 15A and 15B, the movement vectors Vw2 and Vt1 and the true movement vectors Vw1 and Vt2 are displayed with start points that are the feature points Qw2, Qt1, Qw1, and Qt2, and thicknesses according to the probabilities Pw2, Pt1, Pw1, and Pt2.

In the display, the color of the movement vector or the true movement vector may be changed according to the probability (for example, the movement vector with a high probability has blue, and the movement vector with a low probability has red) or brightness thereof may be changed (for example, the movement vector is brighter as the probability is higher). Further, a letter, a figure, a symbol, or the like indicating the probability may be displayed.

When the display and recording in step S18 ends, the process proceeds to step S20 in which the imaging unit 10 is rotated on the basis of the direction and size of the true movement vectors Vw1 and Vt2 (imaging unit rotation step), and step S10 and subsequent processes are repeated. Accordingly, it is possible to successively track and image the subject. In a case where the subject detected in the wide-angle image is not detected in the telescopic image in step S20, the imaging unit 10 may be rotated by the pan and tilt device 50, as necessary.

As described above, in the imaging device 30 according to the first embodiment, since the true movement vector is extracted on the basis of the probability, it is possible to recognize the motion of the subject even in a case where there is interference and to easily cope with the interference. Further, since the imaging unit 10 is rotated on the basis of the true movement vectors Vw1 and Vt2, it is possible to successively track the subject even in a case where there is interference.

The imaging device 30 according to the first embodiment can be installed in a building or the like and used as a surveillance camera or can be mounted on a mobile body such as a vehicle and used as an in-vehicle camera.

In the first embodiment, the example in which the number of subjects is one has been described. However, in the present invention, the number of subjects is not limited to one, and in a case where a plurality of subjects are detected, a process such as a true movement vector extraction can be performed on each of the subjects. Further, in the first embodiment, it should be noted that the true movement vector may be extracted in order to recognize the motion of the subject and successively track the motion, and it is not necessary to create the image from which the interference has been removed (it is not necessary to perform image processing on the image as illustrated in FIGS. 8A and 8B and obtain the image as illustrated in FIGS. 7A and 7B).

Second Embodiment of Imaging Unit

Figure 16:
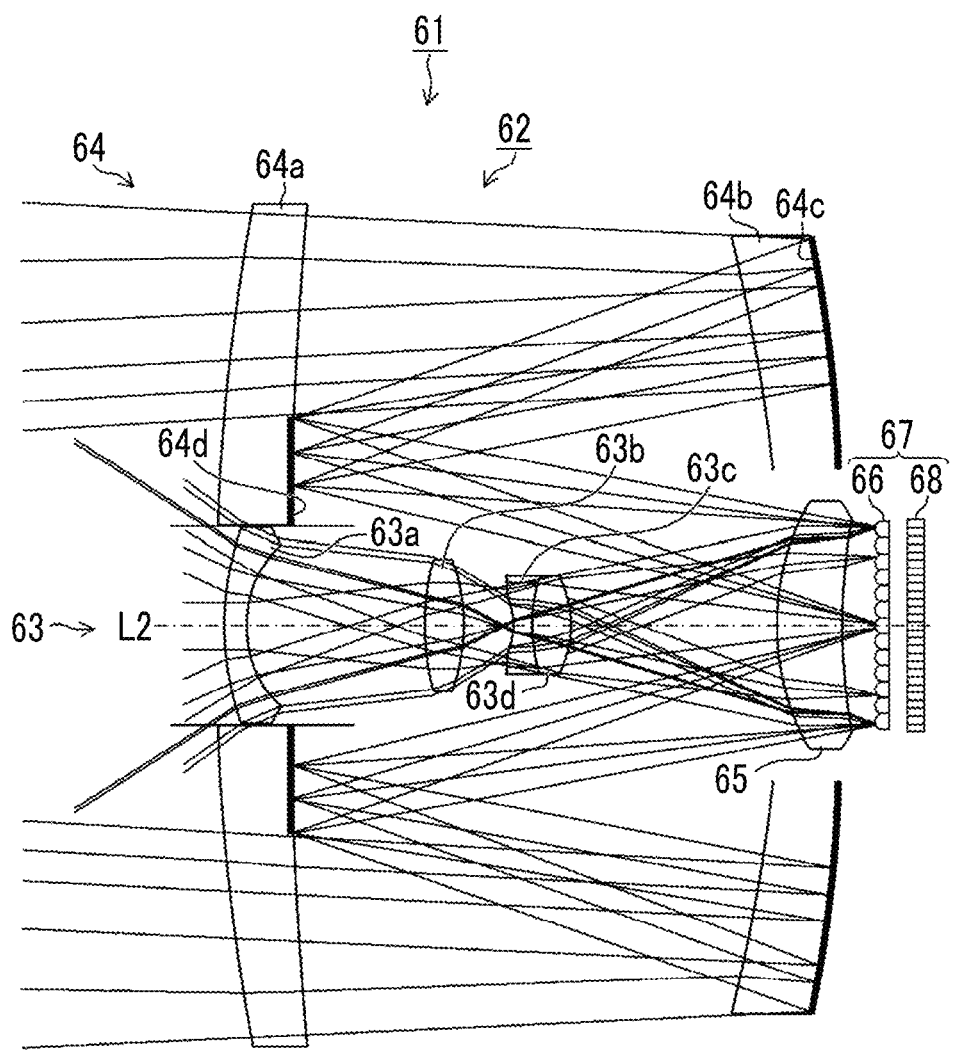
FIG. 16 is a cross-sectional view illustrating a second embodiment of an imaging unit.

Next, a second embodiment of the imaging unit in the present invention will be described. FIG. 16 is a cross-sectional view illustrating the imaging unit 61 according to the second embodiment.

As illustrated in FIG. 16, the imaging unit 61 according to the second embodiment includes an imaging optical system 62 and a directivity sensor 67.

<Imaging Optical System>

The imaging optical system 62 includes a central optical system 63 in a central portion as a first optical system and an annular optical system 64 as a second optical system in a concentric shape in a peripheral portion thereof, which are arranged on the same optical axis L2.

The central optical system 63 is a wide-angle optical system including a first lens 63a, a second lens 63b, a third lens 63c, a fourth lens 63d, and a common lens 65, and causes a wide-angle image to be formed on a microlens array 66 constituting the directivity sensor 67.

The annular optical system 64 is a telescopic optical system including a first lens 64a, a second lens 64b, a first reflecting mirror 64c as a reflecting optical system, a second reflecting mirror 64d, and a common lens 65, and causes a telescopic image to be formed on the microlens array 66. A light flux incident through the first lens 64a and the second lens 64b is reflected twice by the first reflecting mirror 64c and the second reflecting mirror 64d and then passes through the common lens 65. By folding the light flux using the first reflecting mirror 64c and the second reflecting mirror 64d, a length in the optical axis direction of the telescopic optical system having a long focal length is shortened.

<Directivity Sensor>

The directivity sensor 67 includes the microlens array 66 and an image sensor 68.

Figure 17:
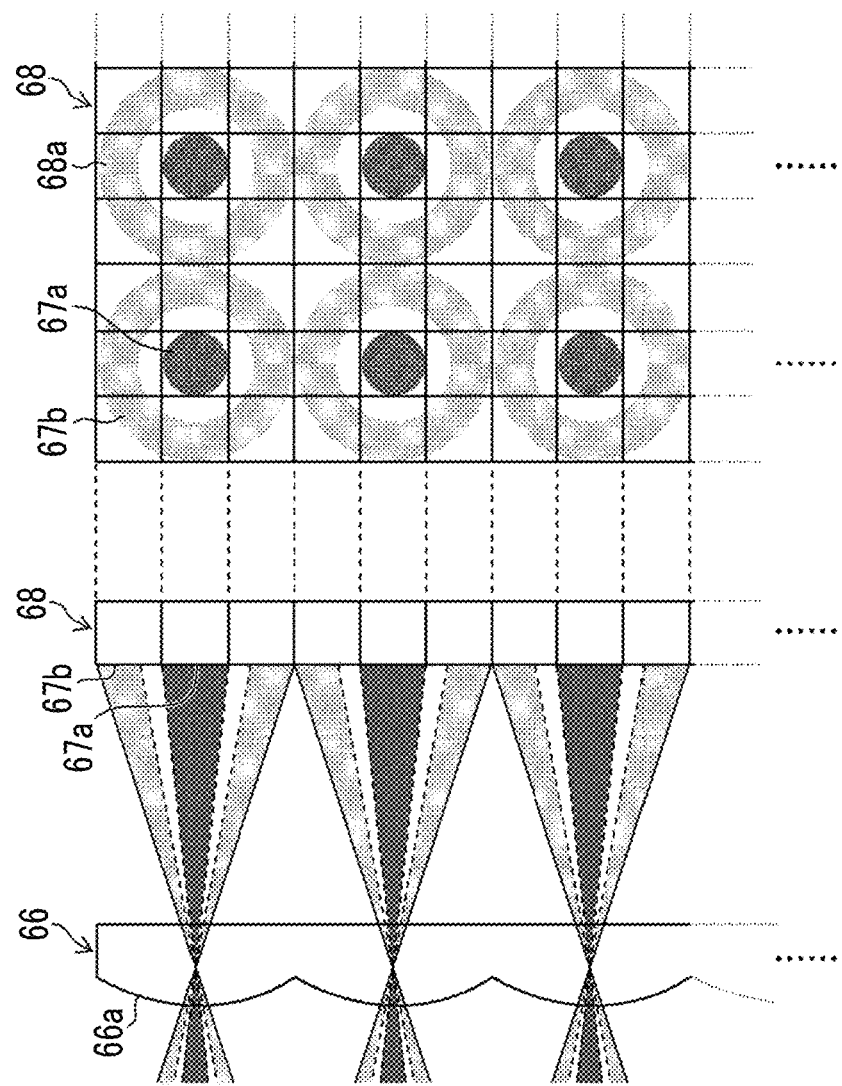
FIG. 17 is a diagram illustrating a state of light reception in a directivity sensor in the imaging unit illustrated in FIG. 16.

FIG. 17 is an enlarged view of main parts of the microlens array 66 and the image sensor 68.

The microlens array 66 is configured by arranging a plurality of microlenses (pupil imaging lenses) 66a in a two-dimensional shape, and intervals in horizontal and vertical directions of the respective microlenses correspond to intervals corresponding to three light reception cells 68a that are photoelectric conversion elements of the image sensor 68. That is, for each microlens of the microlens array 66, a microlens formed corresponding to a position of every two light reception cells in each of the horizontal direction and the vertical direction is used.

Further, each microlens 66a of the microlens array 66 causes a circular central pupil image (first pupil image) 67a and an annular pupil image (second pupil image) 67b corresponding to the central optical system 63 and the annular optical system 64 of the imaging optical system 62 to be formed on the light reception cell 68a of the corresponding light reception area of the image sensor 68.

According to the microlens array 66 and the image sensor 68 illustrated in FIG. 17, 3×3 light reception cells 68a in the form of a lattice (square lattice) are allocated per microlens 66a of the microlens array 66. Hereinafter, one microlens 66a and a light reception cell group (3×3 light reception cells 68a) corresponding to one microlens 66a are referred to as a unit block.

The central pupil image 67a is formed on only the central light reception cell 68a of the unit block, and the annular pupil image 67b is formed on the eight light reception cells 68a around the unit block.

According to the imaging unit 61 having the above-described configuration, it is possible to simultaneously capture a wide-angle image corresponding to the central optical system 63 and a telescopic image (an image having a greater imaging magnification than the wide-angle image) corresponding to the annular optical system 64.

In the image sensor 68, a color filter array including color filters (optical filters) of R (red), G (green), and B (blue) arranged on each light reception cell is provided, and a wide-angle image and a color telescopic image can be obtained by performing a demosaicing process (synchronization process) on the image of each color (mosaic image) obtained corresponding to a color arrangement pattern of the color filter array.

A process of detection of a movement vector or a process of extraction of a true movement vector can be performed on the wide-angle image and the telescopic image acquired by the imaging unit 61 as in the first embodiment described above. Accordingly, in the second embodiment, even in a case where there is interference, a motion of the subject can be recognized, interference can be easily coped, and the subject can be successively tracked.

Third Embodiment of Imaging Unit

Figure 18:
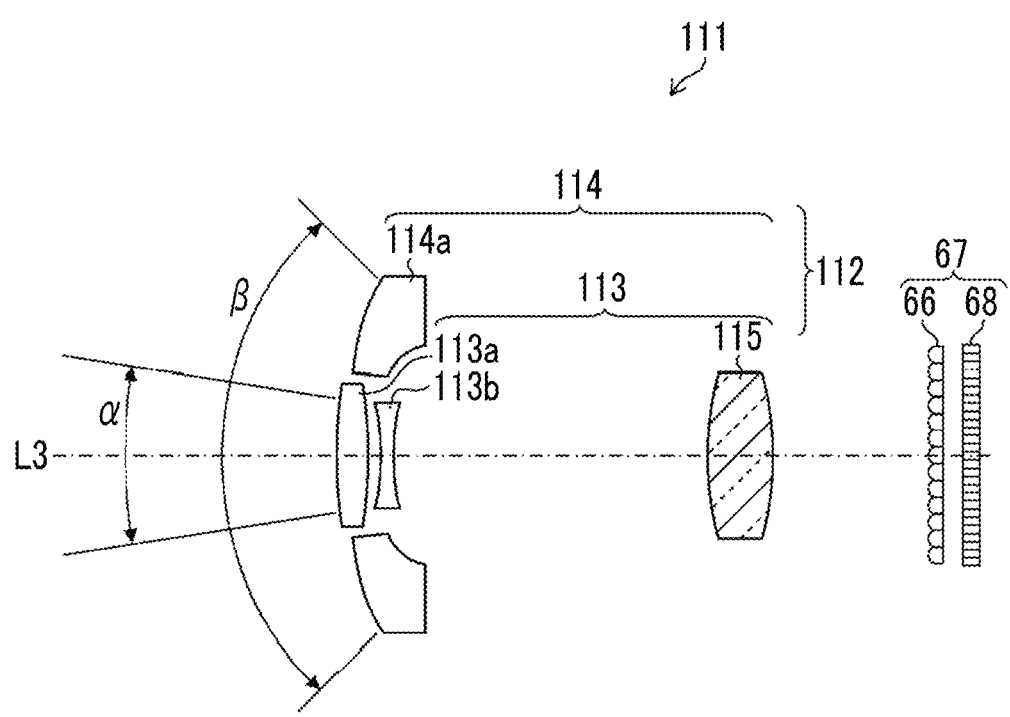
FIG. 18 is a cross-sectional view illustrating a third embodiment of the imaging unit.

A third embodiment of the imaging unit in the present invention will be described. FIG. 18 is a cross-sectional view illustrating an imaging unit 111 according to the third embodiment.

The imaging unit 111 includes an imaging optical system 112 and a directivity sensor 67. Since the directivity sensor 67 is the same as that illustrated in FIGS. 16 and 17, the imaging optical system 112 will be described below.

The imaging optical system 112 includes a first optical system 113 (central optical system) in a central portion and a second optical system 114 (annular optical system in a peripheral portion) arranged on the same optical axis L3.

The central optical system 113 is a telescopic optical system including a first lens 113a, a second lens 113b, and a common lens 115, and has an angle of view α. On the other hand, the annular optical system 114 is a wide-angle optical system including a lens 114a and a common lens 115, has an angle of view β (β>α), and is wider in angle than the central optical system 113.

The imaging optical system 112 does not use a reflecting mirror, unlike the imaging optical system 62 illustrated in FIG. 16. The imaging optical system 112 is different from the imaging optical system 62 in that the central optical system 113 is a telescopic optical system, and the annular optical system 114 is a wide-angle optical system.

A process of detection of a movement vector or a process of extraction of a true movement vector can be performed on the wide-angle image and the telescopic image acquired by the imaging unit 111 as in the first embodiment and the second embodiment described above. Accordingly, in the third embodiment, even in a case where there is interference, a motion of the subject can be recognized, interference can be easily handled, and the subject can be successively tracked.

<Others>

Although the case in which the first optical system is the circular optical system arranged in the central portion, and the second optical system is the annular optical system arranged in an annular shape in the peripheral portion of the first optical system has been described in the first to third embodiments described above, the first and second optical systems in the imaging optical system according to the present invention may be arranged, for example, in different areas within a surface perpendicular to the optical axis so that the first and second optical systems are half-moon type optical systems.

Further, although the case where the focal lengths (imaging angles of view) of the first and second optical systems are different from each other has been described in the first to third embodiments, different imaging characteristics in the first and second optical systems are not limited to the focal length (imaging angle of view) and focusing distances or frequencies of transmitted light may be different.

Further, although the case where the optical axes of the optical systems (the first and second optical systems) are common has been described in the first to third embodiments, the optical axes of the optical systems may not be common in the present invention. In a case where the optical axes of the first and second optical systems form an angle which is not zero, the imaging angles of view of the first and second optical systems may be partially overlapped.

Further, in the present invention, the number of optical systems is not limited to two and may be three or more. In a case where three or more optical systems are used, the first or second optical system may include a plurality of optical systems.

Although the example of the present invention have been described above, the present invention is not limited to the above-described embodiments, and various modifications can be made without departing from the spirit of the present invention.

EXPLANATION OF REFERENCES 10, 61, 111: imaging unit
11, 62, 112: imaging optical system 21: first optical system
22: second optical system
24: imaging element
24a: first sensor group
24b: second sensor group
30: imaging device
32: image generation unit
38: image processing unit
39: recording unit
40: display controller
41: display unit
50: pan and tilt device
67: directivity sensor
Qw1, Qw2, Qt1, Qt2: feature point
Vw1, Vw2, Vt1, Vt2: movement vector

What is claimed is:

1. An imaging device comprising:
an imaging unit that includes an imaging optical system including a first optical system and a second optical system that are provided in different areas and have different imaging characteristics, and a directivity sensor including a plurality of pixels that include photoelectric conversion elements arranged in a two-dimensional shape and pupil-dividing light fluxes that incident via the first optical system and the second optical system, respectively, and selectively receiving the light fluxes using the plurality of pixels;
an image reading unit that acquires an image signal of a first image obtained via the first optical system and an image signal of a second image obtained via the second optical system from the directivity sensor;
a movement vector detection unit that detects a first movement vector that is a movement vector of a subject in the first image and a second movement vector that is a movement vector of the subject in the second image;
a probability calculation unit that calculates a first probability indicating a probability of the first movement vector being a movement vector due to a light flux passing through the first optical system and a second probability indicating a probability of the second movement vector being a movement vector due to a light flux passing through the second optical system; and
a movement vector extraction unit that extracts a first true movement vector that is a movement vector due to the light flux passing through the first optical system in the first image and a second true movement vector that is a movement vector due to the light flux passing through the second optical system in the second image, on the basis of the first movement vector, the second movement vector, the first probability and the second probability.

2. The imaging device according to claim 1,
wherein one of the first optical system and the second optical system is a wide-angle optical system, and the other is a telescopic optical system having an optical axis common to the wide-angle optical system.

3. The imaging device according to claim 1,
wherein the movement vector detection unit
detects a first feature point of the subject from a plurality of first images successively acquired and detects a plurality of first movement vectors having different sizes on the basis of the detected first feature point, and
detects a second feature point of the subject from a plurality of second images successively acquired and detects a plurality of second movement vectors having different sizes on the basis of the detected second feature point.

4. The imaging device according to claim 2,
wherein the movement vector detection unit
detects a first feature point of the subject from a plurality of first images successively acquired and detects a plurality of first movement vectors having different sizes on the basis of the detected first feature point, and
detects a second feature point of the subject from a plurality of second images successively acquired and detects a plurality of second movement vectors having different sizes on the basis of the detected second feature point.

5. The imaging device according to claim 3,
wherein the probability calculation unit calculates the first probability for each of the plurality of first movement vectors and calculates the second probability for each of the plurality of second movement vectors.

6. The imaging device according to claim 3,
wherein the probability calculation unit calculates the first probability for each of the plurality of first movement vectors and the second probability for each of the plurality of second movement vectors, on the basis of a brightness signal at the first feature point and a brightness signal at a feature point corresponding to the first feature point among the second feature points.

7. The imaging device according to claim 1,
wherein the movement vector extraction unit
determines that the second movement vector corresponding to one movement vector among the plurality of first movement vectors is a movement vector caused by interference from the first optical system to the second optical system in a case where the first probability for the one movement vector is higher than the second probability for the second movement vector corresponding to the one movement vector, and extracts the one movement vector as the first true movement vector, and
determines that the one movement vector is a movement vector caused by interference from the second optical system to the first optical system in a case where the first probability for the one movement vector is equal to or lower than the second probability for the second movement vector corresponding to the one movement vector, and extracts the second movement vector as the second true movement vector.

8. The imaging device according to claim 1,
wherein the imaging optical system is an imaging optical system in which the first optical system is arranged in a central portion and the second optical system is arranged in an annular shape in a peripheral portion of the first optical system.

9. The imaging device according to claim 1, further comprising a display unit that displays the first image, the first movement vector, the first probability and the first true movement vector, and the second image, the second movement vector, the second probability and the second true movement vector.

10. The imaging device according to claim 9,
wherein the display unit displays the first movement vector and the first true movement vector according to the first probability, and displays the second movement vector and the second true movement vector according to the second probability.

11. The imaging device according to claim 1, further comprising a recording unit that records the first image, the first movement vector, the first probability and the first true movement vector, and the second image, the second movement vector, the second probability and the second true movement vector.

12. An imaging method of an imaging device according to claim 1 including an imaging unit that includes an imaging optical system including a first optical system and a second optical system that are provided in different areas and have different imaging characteristics, and a directivity sensor including a plurality of pixels that include photoelectric conversion elements arranged in a two-dimensional shape and pupil-dividing light fluxes that incident via the first optical system and the second optical system, respectively, and selectively receiving the light fluxes using the plurality of pixels, the imaging method comprising:
    an image reading step of acquiring an image signal of a first image obtained via the first optical system and an image signal of a second image obtained via the second optical system from the directivity sensor;
    a movement vector detection step of detecting a first movement vector that is a movement vector of a subject in the first image and a second movement vector that is a movement vector of the subject in the second image;
    a probability calculation step of calculating a first probability indicating a probability of the first movement vector being a movement vector due to a light flux passing through the first optical system and a second probability indicating a probability of the second movement vector being a movement vector due to a light flux passing through the second optical system; and
    a movement vector extraction step of extracting a first true movement vector that is a movement vector due to the light flux passing through the first optical system in the first image and a second true movement vector that is a movement vector due to the light flux passing through the second optical system in the second image, on the basis of the first movement vector, the second movement vector, the first probability and the second probability.

13. The imaging method according to claim 12,
    wherein one of the first optical system and the second optical system is a wide-angle optical system, and the other is a telescopic optical system having an optical axis common to the wide-angle optical system.

14. The imaging method according to claim 12,
    wherein the movement vector detection step includes
    detecting a first feature point of the subject from a plurality of first images successively acquired and detecting a plurality of first movement vectors having different sizes on the basis of the detected first feature point, and
    detecting a second feature point of the subject from a plurality of second images successively acquired and detecting a plurality of second movement vectors having different sizes on the basis of the detected second feature point.

15. The imaging method according to claim 14,
    wherein the probability calculation step includes calculating the first probability for each of the plurality of first movement vectors and calculating the second probability for each of the plurality of second movement vectors.

16. The imaging method according to claim 14,
    wherein the probability calculation step includes calculating the first probability for each of the plurality of first movement vectors and the second probability for each of the plurality of second movement vectors, on the basis of a brightness signal at the first feature point and a brightness signal at a feature point corresponding to the first feature point among the second feature points.

17. The imaging method according to claim 12,
    wherein the movement vector extraction step includes
    determining that the second movement vector corresponding to one movement vector among the plurality of first movement vectors is a movement vector caused by interference from the first optical system to the second optical system in a case where the first probability for the one movement vector is higher than the second probability for the second movement vector corresponding to the one movement vector, and extracting the one movement vector as the first true movement vector, and
    determining that the one movement vector is a movement vector caused by interference from the second optical system to the first optical system in a case where the first probability for the one movement vector is equal to or lower than the second probability for the second movement vector corresponding to the one movement vector, and extracting the second movement vector as the second true movement vector.

18. The imaging method according to claim 12, further comprising an imaging unit rotation step of rotating the imaging unit on the basis of the extracted first true movement vector and the extracted second true movement vector,
    wherein the image reading step, the movement vector detection step, the probability calculation step, and the movement vector extraction step are repeated while rotating the imaging unit through the imaging unit rotation step.

19. The imaging method according to claim 18,
    wherein the imaging unit rotation step includes rotating the imaging unit so that the subject detected in the first image is also detected in the second image.

20. A non-transitory recording medium on which a computer-readable code of the program is recorded, wherein program that causes an imaging device to execute the imaging method according to claim 12.

* * * * *